United States Patent Office 3,500,929
Patented Mar. 17, 1970

3,500,929
TEMPORARY DIVERTING AGENT AND USE THEREOF IN TREATMEINT OF SUBTERRANEAN STRATA
Louis H. Eilers and Caleb M. Stout, Tulsa, Okla., assignors to The Dow Chemical Company, Midland, Mich., a corporation of Delaware
No Drawing. Filed Sept. 3, 1968, Ser. No. 757,139
Int. Cl. E21b 33/138
U.S. Cl. 166—295     10 Claims

ABSTRACT OF THE DISCLOSURE

A composition of matter useful as a diverting agent in the treatment of subterranean strata penetrated by a wellbore such as is found in oil, gas, water wells, etc.; comprising: an aqueous suspension containing slowly water soluble particulate dextrin materials, slowly water soluble particulate aldehyde polymers and a thickening and/or suspending agent. The method of treating a subterranean formation penetrated by a wellbore to divert fluids from more porous strata to less porous strata which comprises: injecting said composition down the wellbore under sufficient pressure to force at least a portion of it into the more porous formation wherein said composition serves as a temporary plugging agent to divert fluids, such as fracturing fluids or other treating fluids to less porous, accessible or tighter portions of the formation.

BACKGROUND

In the fluid treatment of mineral bearing subterranean formations penetrated by a wellbore, e.g., by injecting a treating liquid, e.g., acidizing, fracturing or flooding liquid, into such formations to stimulate the flow of natural liquids or gases toward the wellbore, there is often a need to temporarily inhibit too rapid dissipation of the treating fluid through existing channels, fissures, and the like in the formation. Unless inhibition of such rapid dissipation is effectuated, very often the treating fluids take a course in the formation wherein stimulation of production of natural occurring fluids is least needed and often where such natural fluids have already been depleted.

In an atempt to alleviate this problem, one or more of a number of known fluid-loss control agents (diverting agents) have been admixed with liquids injected into a geologic formation in attempts to seal off and divert a treating liquid from the more open and readily accessible portions of the formation to the tighter portions. Many of such fluid-loss control agents heretofore used have not been completely effective as diverting agents because they have had a tendency to plug, more-or-less permanently, the channels into which they lodge, and/or have been too weak to withstand elevated treating pressures. One example of a known diverting agent compositon consists of an aqueous suspension of aldehyde polymers and guar gum, disclosed in U.S. Patent No. 3,353,604.

The composition of the present invention, when employed as a temporary diverting agent, provides a seal or plug which can withstand greater pressures than for example the agent disclosed in U.S. Patent No. 3,353,604. Furthermore, a less amount of the composition need be employed and it can be dissolved within a shorter period of time after being placed in position thus allowing ready resumption of normal operations. Other advantages over compositions now employed, including the composition disclosed in U.S. Patent No. 3,353,604, are (a) larger aldehyde polymer particles are employed thus alleviating handling and irritation problems caused by the toxic nature of finely divided aldehyde powders and (b) better suspension of the solid components in carrier liquids is achieved.

SUMMARY OF THE INVENTION

The novel treating form of the composition of the present invention comprises an aqueous suspension containing, (1) an aqueous carrier liquid; (2) a thickening or suspending agent, other than dextrin materials, possessing gelation properties and provided in an amount which will produce a sufficient viscosity in the aqueous carrier liquid to retain the other solids substantially evenly distributed therein but still remain flowable or pumpable, (3) a particulate dextrin material which is slowly soluble in aqueous solutions, and (4) a particulate aldehyde polymer which is slowly soluble in aqueous solutions. The method of the present invention comprises injecting said composition down a wellbore penetrating a subterranean formation under sufficient pressure to emplace at least a portion thereof into the more porous sections of the formation to seal and plug the same.

PREFERRED EMBODIMENTS OF THE INVENTION

The present diverting agent, as a concentrate, comprises the following constituents, as percent by weight based on the total of these constituents.

| Constituent | Range, percent | Preferred range, percent |
|---|---|---|
| Particulate dextrin material | 30 to 90 | 40 to 80. |
| Particulate aldehyde polymer | 10 to 60 | 15 to 50. |
| Thickening or suspending agent other than dextrins. | 0.1 to 15 | 1 to 12. |
| Optionally water insoluble adulterants | 0 to 35 | 0 to 25. |

To provide an aqueous suspension, an aqueous carrier liquid is provided in an amount such that the above concentrate makes up from about 1 to 60 percent of the aqueous carrier liquid.

In the practice of the present invention the thickening or gelling agent can be any one or more liquids or solids, other than dextrin materials, known to impart increased viscosity and suspending properties to an aqueous liquid. Suitable thickeners include, particulate natural gums, such as glactomannans, including guar, soy bean, karaya, Irish moss, tragacanth, kelp, and acacia gums; particulate starches and proteinaceous portions of natural grains and seeds which tend to form a colloidal suspension in water or aqueous solutions. Water soluble particulate synthetic resins such as polyvinyltoluene sulfonate, polystyrene sulfonate, polyacrylamide (both linear and cross-linked), and particularly alkali metal salts of the polymers can also be employed. Metallic soaps, e.g., the metal salts of certain fatty acids such as Na, K, or other metallic salts of acids such as stearic, naphthenic or octanoic fatty acids are also useful as gelling or thickening agents, either alone or in admixture with the natural or synthetic resins. Also, polyethylenimine, polyalkylamines and the like can be used. When particulate thickening agents are used it is preferred that the particle size should be such that at least about 90% by weight pass through a 100 mesh screen and substantially the balance pass through a 60 mesh screen.

Preferably the thickening agent should be employed in an amount such as to increase the viscosity of the aqueous vehicle or carrier liquid to at least about 10 centipoises and preferably to at least 100 centipoises. A suspending agent in an amount of between about 0.1 and 5.0% by weight of the aqueous vehicle can be employed, while between about 0.5 and 2.0% is usually used. The exact amount will depend, of course, on the particular gelling agent employed. The limit of the amount of gelling agent is merely one of practical limits, i.e., at too great a concentration the aqueous liquid carrier will become too viscous to be easily delivered into the formation to be treated.

The particulate aldehyde polymers employed herein should range in size from about No. 3 to No. 100 mesh U.S. Standard Sieve Series. Furthermore, it is preferred that the aldehyde particles are substantially evenly distributed within this range, so that there is approximately the same number of particles within each unit size range.

Aldehyde polymers which can be used in the practice of the invention are those which are slowly soluble in aqueous solutions and includes for example: paraformaldehyde, the higher polymers being soluble in water to the extent of about 37 grams per 100 grams of water (at 18° C.); metaldehyde (being soluble in water to the extent of about 21 grams per 100 grams of water at 25° C.); and trioxane which is a cyclic aldehyde and soluble in water to the extent of about 18 grams per 100 grams of water at 18° C. Additional characteristics of paraformaldehyde, metaldehyde, and trioxane may be found in the literature, e.g., Fieser and Fieser, Organic Chemistry, 199–201, 3rd ed. (1965); and Noller, Textbook of Organic Chemistry, 212–215, 3rd ed. (1966). Other aldehyde polymers having a solubility of more than about 1 gram per 100 grams of water can also be employed.

At least a portion of the dextrin materials employed in the composition are those which are slowly soluble in aqueous solutions. As employed herein dextrin materials which are soluble in water to the extent of more than about 1 gram per 100 grams of water at about 25° C. can be employed. Dextrin materials having a solubility of more than about 4 grams per 100 grams of water at 25° C. are usually preferred. The dextrin should be one which is slowly soluble in aqueous fluids and which remains substantially undissolved at least until the treatment, e.g., fracturing or acidizing, of the formation is completed. Dextrin materials as employed herein refers to the intermediate granular or particulate products formed by the hydrolysis of starches. The particle size can range from about 3 to about 325 mesh. The dextrins are produced by methods well known in the art. One method consists of heating dry starches along at temperatures of from about 180° to 210° C. to produce what are commonly referred to as "British gums."

In another method, starches are hydrolyzed by treatment with an acid, either with or without the addition of heat. Dextrin materials differ from the starches in that they no longer show swelling properties in water but certain forms undergo dissolution by sloughing off in concentric layers. Dextrins vary in solubility from very insoluble to greatly soluble in cold water and the degree of solubility is dependent on the level of conversion from the starch structures. The method of manufacture will determine the extent of solubility. Commercial available dextrin materials can be obtained in the form of mixtures of the dextrinization products and undextrinized starch or materials consisting of dextrin materials which are substantially free of undextrinized starch starting materials. Either form can be employed in the practice of the present invention. An example of a suitable dextrin material would be the product prepared by dextrinizing starch until it is substantially water soluble. The water soluble product is then separated from insoluble material and crosslinked in a manner such that it is slowly soluble in water at temperatures ranging, for example, from 60° to about 160° F. The dextrin materials have no definite formulae. In the practice of the present invention dextrin materials are employed which are slowly soluble in aqueous solutions. More detailed information on the nature and manufacture of dextrins can be had by reference to 2 Whistler & Pashchall, Starch: Chemistry and Technology, 254–276 (1967). Dextrin materials are commonly used in adhesives as binders and the like. It has been found that when employed with certain aldehyde polymers, as defined hereinbefore, slowly water soluble diverting agents can be formed which are stronger than those heretofore known.

The dextrins and aldehyde polymers are usually employed in amounts ranging from a weight proportion of 1:1 to 9:1 of dextrin to aldehyde polymer. It is usually preferred that dextrin and aldehyde polymer particles be of such a size distribution that there is approximately the same number of particles of each particle size in the composition of the present invention.

Optionally, up to about 35 percent by weight of the concentrate composition may consist of particulate adulterant materials which are insoluble or only slightly soluble in aqueous solutions. These adulterants are employed to strengthen the composition and to replace a portion of the more expensive components, e.g., aldehyde polymers and dextrin materials. The adulterants consist of materials which are sufficiently strong to withstand the pressures to be employed in a liquid treatment and which remain suspended with the other solid components of the composition. Examples of suitable materials which may be employed as adulterants are: sand, particulated limestone (gravel), particulated naphthalene, gypsum and the like. The adulterant materials usually range in size from No. 3 to about No. 325 mesh, U.S. Standard Sieve Series. These adulterants are used to replace particles of the other components which are substantially within the same size range. Upon dissolution of the other components of the diverting composition after emplacement in a formation the adulterant materials will leave a porous network which, if desired, can be removed from the formation. For example, naphthalene may be slowly dissolved in water over a period of days and limestone may be removed by acidizing with hydrochloric acid.

The method of the present invention can be employed in conjunction with formation treatments: in flooding operations wherein an aqueous solution is injected down one or more injection wells; in fracturing; and in acidizing. When so employed it provides an improvement in these typical treating processes.

In general the method consists of introducing the aqueous diverting agent composition as defined herein down a wellbore under sufficient pressure to provide a plug or seal in the more porous sections of a formation. The point in time when the composition is introduced into the formation will depend on the treating operation being performed and the nature of the formation being treated. For example, if an existing formation already has porous sections caused by existing fissures and the like and it is desired to fracture, flood or acidize other portions of the formation, the diverting agent can be introduced into the formation in the first instance to seal off these porous sections. Following this the necessary treatment precedure can be employed. In another instance, a formation may be first fractured, as an example, and then the diverting agent introduced to seal these fractures. Following this the formation can be further fractured in other areas to increase the productivity of the particular well. These procedures may be repeated several times until the necessary treatment of the formation has been accomplished. The aqueous carrier liquid for diverting agent concentrate may consist of the aqueous treating liquid being employed in the flooding, acidizing or fracturing operation.

Therefore, in practice, the diverting agent concentrate may be premixed with an aqueous liquid or it may be blended into an aqueous treating liquid as it is being conveyed to or as it is being pumped down the well.

One advantage of the diverting agent of the present invention is that it may be removed from the formation within a short period of time following a treating operation by dissolving it in an aqueous solution.

In water flooding, pressures sufficiently high to fracture the formation are not ordinarily reached. In accordance with the invention, the diverting agent is introduced into the well to seal existing channels and thereby divert the flooding water to less accessible channels to sweep along the formation fluid desired to be produced at the production well.

Fracturing in accordance with the invention, of course, requires that fracturing pressures be attained. The first fractures created can be temporarily plugged by use of the present composition, thereby causing subsequent fracturing to occur elsewhere in the formation.

Acidizing, according to the invention, may be carried out with or without sufficient pressures to also fracture the formations. When the formation is first acidized the earlier etched channels can be temporarily plugged by the diverting agent as defined herein, as a result of which subsequently injected acid is diverted to portions of the formation where there has been little or no acid attack.

The following examples will facilitate a more complete understanding of the present invention but it is understood that the invention is not limited to the specific embodiments incorporated therein.

EXAMPLE 1

Except for Mixes A and E, the following recipes are illustrative of concentrates of diverting agent compositions within the scope of the present invention. The concentrations are noted as percent by weight.

Mix A

| | Percent |
|---|---|
| Flake paraformaldehyde | 49.5 |
| Powdered paraformaldehyde | 1.0 |
| Thickener consisting of powdered guar gum | 1.0 |

Mix B

| | |
|---|---|
| Particulated dextrinized starch | 50 |
| Flake paraformaldehyde | 40 |
| Thickeners consisting of (pregelatinized starch, 60%; gum karaya, 30%; sodium polystyrene sulfonate, 10%) | 10 |

The following Table I is a sieve analysis U.S. Standard Sieve Series, of the solids in the foregoing mixes.

TABLE I

| | Percent of Solids (total) within mesh range | | | | |
|---|---|---|---|---|---|
| | Mix No. | | | | |
| | A | B | C | D | E |
| Size By No. Mesh Range: | | | | | |
| 3-4 | 0 | 8 | 11 | 3 | 5 |
| 4-10 | 15 | 33 | 32 | 44 | 46 |
| 10-40 | 35 | 45 | 43 | 37 | 31 |
| 40-100 | 2 | 9 | 9 | 11 | 12 |
| Greater than 100 | 48 | 5 | 5 | 5 | 6 |

Each of these mixes was tested for plugging efficiency over slots one inch long and 0.15 or 0.25 inch wide. One of these slots was placed at one opening of a four liter, high pressure reservoir. The mixture to be tested was dispersed into water at a concentration as indicated in the gm. columns of the following Table II. The mix was poured into the reservoir with the slotted end shut until the reservoir was filled. Hydraulic pressure of 60 to 65 p.s.i.g. was then placed on the system and the slot opened until flow through the slot stopped. The amount of fluid loss at this point was measured. The amount of solids originally carried by this volume of fluid was considered to be the grams of agent required to divert fluid from the slot.

Mix A consisted of a commercially available diverting agent and Mix E consisted of a mixture containing no aldehyde polymers. Both were employed as controls.

In Run No. 3, after the slots were plugged as described above, additional hydraulic pressure was then applied to the plugs by a high pressure pump until the plug gave way, allowing a flow of liquid through the slot. The pressure, as p.s.i., at which the plug gave way was noted. This pressure demonstrated the strength of the plug. The size of slots employed, concentrations, amount of solids required to plug and the pressures withstood in Run No. 3 are noted in the following Table II.

TABLE II

| | | | Grams of Mix to Plug Slot and Pressure Withstood | | | | | | | |
|---|---|---|---|---|---|---|---|---|---|---|
| | | | Mix No. | | | | | | | |
| | | | A | | B | | C | | D | | E |
| | | Mix conc., gm./100 ml. H₂O | Commercial Diverting Agent | | | | | | | | Control |
| | Slot size | | Gm. | P.s.i. | Gm. | P.s.i. | Gm. | P.s.i. | Gm. | P.s.i. | Gm. | P.s.i. |
| Run No.: | | | | | | | | | | | | |
| 1 | 1 in./0.15 in. | 24 | 150 | | 65 | | 60 | | 75 | | 70 | |
| 2 | 1 in./0.15 in. | 1.2 | >1,000 | | | | 240 | | 950 | | 800 | |
| 3 | 1 in./0.25 in. | 24 | 600 | 250 | 250 | 700 | 200 | 800 | 400 | 1,000 | 420 | 700 |
| 4 | 1 in./0.25 in. | 60 | 110 | | 30 | | 38 | | 80 | | 85 | |

Mix C

| | |
|---|---|
| Particulated dextrinized starch | 45 |
| Flake paraformaldehyde | 35 |
| An adulterant consisting of 3-4 mesh naphthalene | 10 |
| Thickeners consisting of (pregelatinized starch, 60%; gum karaya, 30%; sodium polystyrene sulfonate, 10%) | 10 |

Mix D

| | |
|---|---|
| Particulated dextrinized starch | 75 |
| Flake paraformaldehyde | 20 |
| Thickener consisting of powdered guar gum | 5 |

Mix E

| | |
|---|---|
| Particulated dextrinized starch | 90 |
| Pregelatinized starch | 6 |
| Thickeners consisting of (gum karaya, 75%; sodium polystyrene sulfonate, 25%) | 4 |

As noted by these tests Mixes B and C having more nearly 1:1 proportions of paraformaldehyde to dextrin, showed superior results as a plugging agent while all of B, C, D and E showed superior strength properties over Mix A at a concentration of 24 gm./100 ml. H₂O.

EXAMPLE 2

In this example plugs were prepared in 1 inch by 0.25 inch slots employing the same mixes and in the same manner as used in Example 1 at a concentration of 60 gms./100 ml. H₂O. The plugs were prepared under a pressure of 200 p.s.i. Fresh water at a rate of 1 ml. per second (approximately 1 gallon per hour) was passed over each plug at 60 p.s.i., at a temperature of 70-75° F. The time required for the water to break through each plug (determined when water flow through the slot reached 25 ml. per sec.) was determined as follows: Mix A, 7 hours; Mix B, 5 hours; Mix C, 5.5 hours; Mix E, 10 hours. The mixes within the scope of the present invention showed a shortened plugging period which is advantageous in that they do not plug the treated formations for unnecessarily long periods of time, while still demonstrating as good as or greater strength and plugging properties as other known diverting agents.

EXAMPLE 3

A newly completed water injection well in Pike County, Ind., with a total depth of 1,386 feet and cased to 1,371 feet with 4½ inch casing, was in need of stimulation in the open hole section beneath the casing. The well was treated as follows: 3 barrels of inhibited 15% hydrochloric acid were pumped down the casing to breakdown the formation. This was followed by 23 barrels of water to fill the wellbore. One hundred and thirty barrels of water containing approximately 5,000 lbs. sand were pumped down under pressure at a rate of 10.2 bbls. per minute. Initial pressure was 1,300 p.s.i.g., which slowly reduced to 900 p.s.i.g. Two barrels of acid containing about 25 lbs. of a composition within the scope of this invention consisting of: about 2.5 lbs. of 3 to 4 mesh naphthalene, 10 lbs. particulated dextrin, 7.5 lbs. of flake paraformaldehyde, 2.0 lbs. pregelatinized starch, 1.25 lbs. guar meal, 1.25 lbs. gypsum, 0.75 lb. gum karaya, and 0.25 lb. of a 30% active sodium salt of polystyrene sulfonate, was introduced into the well. The pressure rose from 900 to 1,500 p.s.i.g. as this mixture reached the formation face. One hundred and ten bbls. additional water, containing approximately 5,000 lbs. of sand, were then pumped (still at 10.2 bbls. per min.) into the well. The surface pressure during this time dropped from 1,500 to 950 p.s.i.g. Another two barrels of acid, containing another 25 lbs. of the composition as defined above, were then introduced and the surface pressure again rose to 1,500 p.s.i.g. as this reached the formation face. A final 130 bbls. of water containing approximately 5,000 pounds of sand were then pumped into the wellbore at 10.2 bbls. per minute. Surface pressure again dropped reaching 900 p.s.i.g. by the end of the treatment.

The rate of injection for the treatment was maintained at 10.2 barrels per minute. This injection rate was sufficient to maintain formation surface pressures of from about 1,300 to 1,500 p.s.i.g. which were sufficient to initiate fractures at this depth. Pressures of 900 to 1,000 p.s.i.g. were sufficient to extend such fractures once initiated. Pressure increases of 550 to 600 p.s.i. were produced when the diverting agent reached the formation face thus indicating that the initial fractures were being sealed and new ones initiated. Other water soluble diverting agents have not produced similar pressure increases when used in water or acid at fracturing rates and pressures similar to those employed herein.

EXAMPLE 4

This example illustrates the treatment of a water source well in White County, Ill. The well was cased to total depth of 338 feet with 8⅝ inch casing. It was perforated between 270 and 324 feet. The well was fractured with 10,000 gallons of water containing 100 lbs. of guar gum and 15,000 lbs. of sand. The injection rate varied between 20 and 22 barrels per minute averaging 21.3 bbls. per minute. Four slugs of 50 lbs. each of the diverting agent as employed in Example 3 were added to the fracturing fluid at approximately the 2,000, 4,000, 6,000 and 8,000 gallon marks. Initial breakdown surface pressure was approximately 2,200 p.s.i.g. which dropped to 1,750 p.s.i.g. before the first diverting slug was added. Surface pressures rose to 2,100 p.s.i.g. as succeeding diverting slugs reached the formation face, and broke to 1,600–1,650 p.s.i.g. during injection of fracture fluid and sand.

In this treatment it was again demonstrated that the diverting agent could plug existing fractures, as evidenced by increased surface pressures. The treating fluid then had to open new fracture channels.

Another diverting agent concentrate which has been employed for treating water bearing formations consists of:

| Constituent | Parts by weight | Percent by weight |
|---|---|---|
| Coarse dextrin particles (3 to 20 mesh) | 25 | 24.51 |
| Fine dextrin particles (15 to 200 mesh) | 15 | 14.71 |
| Flake paraformaldehyde (4 to 40 mesh) | 30 | 29.42 |
| Adulterants, consisting of— Guar meal, 4.90% Particulate naphthalene, 9.80% Gypsum, 4.90% | 20 | 19.60 |
| Thickener and suspending agents consisting of— Cereal binder grade starch, 7.84% Karaya gum, 2.94% Sodium polystyrenesulfonate, 0.98% | 12 | 11.76 |

An effective amount of this composition is dispersed into an aqueous carrier liquid and introduced into a porous formation to be temporarily sealed or plugged. Pregelatinized starch and cereal binder grade starch as employed herein refers to a precooked starch which is rolled dried to provide a substantially dry granulated product.

Various modifications may be made in the present invention without departing from the spirit or scope thereof for it is understood that we are limited only as defined in the appended claims.

What is claimed is:

1. A composition comprising a concentrate, which when added to an aqueous carrier liquid is useful as a diverting agent in the treatment of subterranean formations penetrated by a wellbore which comprises:
    (1) at least one slowly water soluble particulate aldehyde polymer;
    (2) a slowly water soluble particulate dextrin material and
    (3) a suspending agent in a sufficient amount to maintain said particulate polymer and dextrin substantially evenly dispersed in said aqueous liquid carrier when dispersed therein.

2. The composition as defined in claim 1 wherein the concentrate comprises as percent by weight:
    (1) said aldehyde polymer from 10 to 60 percent;
    (2) said dextrin material from 30 to 90 percent; and
    (3) said suspending agent from 0.1 to 15 percent.

3. The composition as defined in claim 2 including in addition an aqueous carrier liquid in an amount such that the concentrate comprises from 1 to 60 percent of said aqueous carrier liquid.

4. The composition as defined in claim 2 including in addition, up to 35 percent by weight of a particulate adulterant material selected from the group consisting of water insoluble, slightly water soluble materials or mixtures of said materials.

5. The composition as defined in any one of claims 1, 2 or 4 including in addition an aqueous carrier liquid in an amount such that said concentrate comprises from 1 to 60 percent by weight of said carrier.

6. The composition as defined in any one of claims 1, 2, 3 or 4 wherein: (1) said particulate aldehyde polymer is selected from the group consiting of paraformaldehyde, metaldehyde, trioxane, or mixtures thereof and (2) said suspending agent is a member selected from the group consisting of guar gum, soy bean gum, karaya gum, Irish moss, tragacanth, kelp, acacia, starches, proteinaceous portions of natural grains and seeds, polyvinyltoluene sulfonate, polystyrene sulfonate, polyacrylamide, metallic salts of fatty acids, polyacrylamines, polyethylenimines and mixtures thereof.

7. The composition as defined in any one of claims 1, 2, 3 or 4 wherein (1) said particles of said particulate aldehyde polymers range in size from about No. 3 to about No. 100 mesh (U.S. Standard Sieve Series); (2) said particulate dextrin materials range in size from about 3 to about 325 mesh, wherein said particulate aldehyde polymers and said particulate dextrin materials are substantially evenly distributed within said 3 to 325 mesh size ranges such that the number of particles within each unit size range is approximately equal and (3) when in said suspending agent consists of particulate materials, said particles of the suspending agent ranging in size wherein at least 90 percent by weight are smaller than No. 100 mesh and substantially the balance are smaller than No. 60 mesh, and are provided in an amount to provide a viscosity in an aqueous liquid carrier of at least 10 centipoises.

8. The method of treating a subterranean formation penetrated by a wellbore, wherein certain portions of the formation are more porous than others which comprises: injecting into the wellbore and into the more porous formation a diverting agent consisting of a composition as defined in claim 3 under sufficient pressure to emplace at least a portion of the diverting agent in the more porous formation to plug at least a portion of said porous formation to divert liquids away from said porous formation.

9. The method as defined in claim 8 wherein said diverting agent consists of the composition as defined in claim 6.

10. The method as defined in claim 8 wherein said diverting agent is a composition as defined in claim 7.

References Cited

UNITED STATES PATENTS

| 3,079,332 | 2/1963 | Wyant | 166—283 |
| 3,319,716 | 5/1967 | Dill | 166—282 |
| 3,353,604 | 11/1967 | Gibson et al. | 166—282 X |
| 3,405,062 | 10/1968 | Kuhn | 252—8.55 |
| 3,408,296 | 10/1968 | Kuhn et al. | 166—283 X |

STEPHEN J. NOVOSAD, Primary Examiner

U.S. Cl. X.R.

166—282, 283, 308; 252—8.55